3,252,784
HERBICIDE CONTAINING PETROLEUM MULCH
Robert H. Salvesen, Clark, N.J., assignor to Esso Research and Engineering Company, a corporation of Delaware
No Drawing. Filed Jan. 3, 1963, Ser. No. 249,114
3 Claims. (Cl. 71—2.6)

The present invention is broadly concerned with establishing and sustaining agricultural crops in the normal agronomic or in semi-arid areas by new and improved methods for conserving and utilizing available moisture. The invention is more particularly concerned with a unique asphaltic composition which contains herbicides. In particular, the present invention relates to petroleum based coatings and to their use in new and improved methods for establishing and sustaining grass and other crops on land which receives an insufficient amount of natural rainfall and in normal growing areas where the mulch film enhances growth and increases crop yields. The mulch serves to warm the soil and to retain sufficient moisture in the soil for seed germination and sustains the growth of such crops and prevents the growth of weeds during the critical early growing stage with a minimum of irrigation. In addition, the herbicide mulch combination keeps down weeds in the crop row where mechanical cultivation is difficult. Specifically, the composition of the present invention comprises an asphalt emulsion, particularly an acidic asphalt emulsion and a pre-emergence weed-killer comprising Amiben (3-amino-2,5-dichlorobenzoic acid). In accordance with the present invention, the effectiveness of Amiben is tremendously increased by its utilization in a mulch as compared to its utilization in the absence of a mulch.

The present invention is particularly concerned with a unique asphalt composition and its application for use as an agricultural mulch. In essence, it is very desirable that the asphalt composition on the ground be a relatively hard asphalt having definite characteristics. It is also essential that the asphalt composition be emulsified, preferably as asphalt and water emulsion, so as to permit its efficient application to the ground so as to secure the desired spreading characteristics. It is essential that the emulsion be stable and not break until it is on the ground since these emulsions must be transported over a wide territorial area and ultimately be placed on the ground in the desired areas by suitable spreading equipment.

It has now been discovered that the moisture necessary for both seed germination and early plant growth can be maintained in the seed bed by applying certain asphalt emulsions over such seed beds according to the methods hereinafter set forth in detail. It has also been discovered that unexpected desirable results are secured by using an asphalt emulsion with a pre-emergence weed-killer comprising 3-amino-2,5-dichlorobenzoic acid.

According to this invention, the emulsion is preferably applied after seeding and before emergence of the plant, and preferably when the moisture content of the seed bed is at or near field capacity. Field capacity is defined as the amount of water held in the soil after excess water has drained away via gravitational force and after the rate of downward movement of water has materially decreased. The asphalt strip covering the seed bed then tends to function in a manner similar to a "one way valve". When a rainfall occurs which is sufficient to temporarily saturate the top layer of soil the lateral movement of moisture is relatively rapid, i.e. at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as non-existent. During the short periods of surface saturation rainfall on the uncoated areas will move under the coated strips to replenish the moisture of the seed bed. When the saturated condition in the uncoated areas ceases to exist, the moisture which has moved beneath the coated strips is trapped and will not be lost to any appreciable extent either by lateral movement or surface evaporation.

In accordance with the present invention, by utilizing an asphalt applied as described above in conjunction with a pre-emergence weed-killer, unexpected desirable results are secured.

Asphalt emulsions which are suitable for use with this invention may be either acidic (cationic) or basic (anionic) although the acidic emulsions are preferred. Both are asphalt-in-water emulsions. Typical specifications for both types are listed in the following table.

TABLE I

*Characteristics and composition of acidic and basic emulsions*

| | Basic | Acidic |
|---|---|---|
| Emulsion characteristics: | | |
| Viscosity, Saybolt Fural at 77° F | 20–200 | 20–200 |
| Residue (by distillation) weight percent | 57–70 | 57–70 |
| Settlement, 5 days, weight percent | 0–3 | 0–3 |
| Residue characteristics: | | |
| Penetration at 77° F., 100 g.; 5 sec | 85–200 | 10–200 |
| Solubility in $CS_2$, percent | 97+ | 97+ |
| Ductility at 77° F., cm | 40+ | 40+ |
| Softening point, ° F | 100–125 | 100–175 |
| Composition, weight percent: | | |
| Water | 30–65 | 30–65 |
| Asphalt | 25–70 | 25–70 |
| Emulsifier [1] | 0.15–1.80 | 0.15–0.82 |
| NaOH | .6–.8 | |
| HCl (36%) | | 0.1–0.4 |

[1] Preferably polyamines for acidic emulsions, fatty acids for basic.

Suitable emulsifying agents for use in preparing these emulsions include the following

CATIONIC AGENTS (1) Primary, secondary, tertiary, and polyamine salts such as the diamine dichloride.

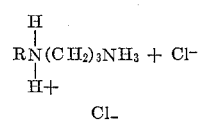

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

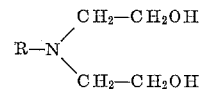

where R is as defined in (1).

(3) Quaternary ammonium salts such as

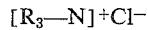

(4) Dimethylated amine salts such as

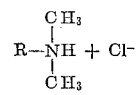

(5) Aromatic amine salts and cyclic amine salts.
(6) 2-imidazoline.

ANIONIC AGENTS

Alkali metal salts of fatty acids such as

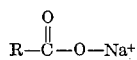

where R is an alkyl or olefinic chain with 8-22 carbon atoms, preferably 14-18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid ($CH_3COOH$) or nitric acid ($HNO_3$) could be used instead of HCl on a mole per mole basis. Also, KOH could be used instead of NaOH although the latter is cheaper.

For the purposes of this invention the emulsions set forth in Table I may or may not be further diluted with 0.1 to 3 parts of water prior to application. These emulsions may be prepared in the conventional manner, as follows:

The emulsifying solution of the desired formulation at a temperature of 120° to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rates by 90 to 99% as compared to bare soil. Such emulsions (based on undiluted emulsion concentrate) should be applied at a rate in the range of 50 to 1000, preferably 250 to 750 gal. per acre of coverage. Thus, the present invention is concerned with the use of asphalt emulsions, particularly acidic asphalt emulsions with a herbicide. The asphalt emulsions may comprise from about 20 to 70% by weight of asphalt and 80 to 30% by weight of water. However, it is preferred that the herbicides of the present invention be utilized in asphalt emulsions where the percent by weight of asphalt present is in the range from about 40 to 55% by weight.

As pointed out heretofore, the effectiveness of Amiben is tremendously increased by its utilization in a mulch as compared to its utilization in the absence of a mulch. By its utilization in a mulch is meant that the herbicide is dispersed in the petroleum mulch by some chemical or mechanical means and applied to the ground in a single operation. By its utilization under mulch is meant that the herbicide is first applied to the ground in an aqueous solution and then the mulch sprayed over the top to form a film.

The amount of Amiben used may vary appreciably as, for example, in the range from about 1 to 6 lbs. of active herbicide per 600 gallons of mulch. A very desirable concentration is in the range from about 1 to 3 lbs. of active herbicide per 600 gallons of mulch. The mulch is so distributed on the ground that the pounds of herbicide per acre is in the range from 1 to 6 lbs. of herbicide, preferably 1 to 3 lbs. of active herbicide.

The present invention may be more fully understood by the following example wherein a number of tests were conducted with results as shown in Table 1.

TABLE 1

*Weed control and crop injury of Amiben on squash (pre-emergence application)*

| Treatment | Lbs./acre of herbicide | Percent weed control after 7 weeks | Percent crop injury after 7 weeks |
|---|---|---|---|
| Amiben, no mulch | 2 | 0 | 60 |
| Do | 4 | 87 | 53 |
| Amiben in mulch | 2 | 98 | 27 |
| Do | 4 | 98 | 40 |
| Amiben under mulch | 2 | 13 | 53 |
| Do | 4 | 87 | 30 |

From the above it is apparent that Amiben at 2 lbs. per acre in mulch is almost 100% effective in controlling weeds whereas without mulch it is 100% ineffective. When the herbicide was used under the mulch with the same concentration, the herbicide was only about 13% effective in killing weeds. In addition to the remarkable difference noted in favor of weed control, this same formulation also gave 33% less crop injury than the herbicide control without the mulch.

Thus, the present invention is concerned with the utilization of a herbicide comprising 3-amino-2,5-dichlorobenzoic acid in an asphaltic type mulch.

What is claimed is:

1. An agricultural composition useful as a mulch and as a selective pre-emergence herbicide for crops normally injured by 3-amino-2,5-dichlorobenzoic acid which composition comprises (a) an asphalt-in-water emulsion of about 20 to 70 wt. percent asphalt and about 80 to 30 wt. percent water and (b) 3-amino-2,5-dichlorobenzoic acid in proportion of about 1 to 6 pounds of said acid to 600 gallons of said emulsion.

2. A composition as defined by claim 1 wherein said emulsion is acidic.

3. A method for improving the pre-emergence herbicidal selectivity of 3 - amino - 2,5-dichlorobenzoic acid when used upon squash normally injured by said acid, which method comprises applying to a bed seeded with said squash about 2 pounds of said acid per acre of said bed, said acid being applied in an asphalt-in-water emulsion said emulsion forming a thin film over said bed, which film is substantially impenetrable to water and penetrable to young seedlings.

References Cited by the Examiner

UNITED STATES PATENTS

| | | | |
|---|---|---|---|
| 1,882,377 | 10/1932 | Whittelsey | 71—2.1 X |
| 1,988,175 | 1/1935 | Merrill | 47—9 X |
| 2,333,959 | 11/1943 | Smith | 47—9 |
| 2,741,550 | 4/1956 | Edmond et al. | 71—2.4 |
| 2,851,824 | 9/1958 | Campbell | 71—1 |
| 3,014,063 | 12/1961 | McLane et al. | 71—2.6 |
| 3,061,974 | 11/1962 | Louis et al. | 47—9 |

FOREIGN PATENTS 963,461    7/1964    Great Britain.

OTHER REFERENCES

Smith (II), The Effect of Asphalt Mulches on the Stabilization of Soils and Aggregate Materials and on Vegetation Cover, an abstract of a thesis, 1953, pages 1 to 9.

LEWIS GOTTS, *Primary Examiner.*

JULIAN S. LEVITT, *Examiner.*